United States Patent
Xiang et al.

(10) Patent No.: US 10,664,511 B2
(45) Date of Patent: May 26, 2020

(54) FAST IDENTIFICATION METHOD AND HOUSEHOLD INTELLIGENT ROBOT

(71) Applicant: YUTOU TECHNOLOGY (HANGZHOU) CO., LTD., Zhejiang (CN)

(72) Inventors: Wenjie Xiang, Zhejiang (CN); Lei Zhu, Zhejiang (CN)

(73) Assignee: Yutou Technology (Hangzhou) Co., Ltd., Zhejiang (CN)

(*) Notice: Subject to any disclaimer, the term of this patent is extended or adjusted under 35 U.S.C. 154(b) by 73 days.

(21) Appl. No.: 15/766,890

(22) PCT Filed: Oct. 9, 2016

(86) PCT No.: PCT/CN2016/101567
§ 371 (c)(1),
(2) Date: Apr. 9, 2018

(87) PCT Pub. No.: WO2017/059815
PCT Pub. Date: Apr. 13, 2017

(65) Prior Publication Data
US 2018/0293236 A1    Oct. 11, 2018

(30) Foreign Application Priority Data
Oct. 9, 2015    (CN) .......................... 2015 1 0650110

(51) Int. Cl.
*G06F 16/432* (2019.01)
*G06K 9/00* (2006.01)
(Continued)

(52) U.S. Cl.
CPC .......... *G06F 16/433* (2019.01); *G06F 16/907* (2019.01); *G06K 9/00228* (2013.01);
(Continued)

(58) Field of Classification Search
CPC ...... G06F 16/433; G06F 16/907; G06F 16/22; G06F 16/9535; G06K 9/00228;
(Continued)

(56) References Cited

U.S. PATENT DOCUMENTS

| 6,347,261 B1 * | 2/2002 | Sakaue | ................. B25J 9/1694 |
| | | | 345/156 |
| 8,706,827 B1 * | 4/2014 | Noble | .................. G10L 13/027 |
| | | | 709/206 |

(Continued)

FOREIGN PATENT DOCUMENTS

| CN | 103345232 A | 10/2013 |
| CN | 104700018 A | 6/2015 |

(Continued)

OTHER PUBLICATIONS

International Search Report for International Patent Application No. PCT/CN2016/101567, dated Jan. 5, 2017, 7 pages.

*Primary Examiner* — Kim Y Vu
*Assistant Examiner* — Molly Delaney
(74) *Attorney, Agent, or Firm* — Withrow & Terranova, PLLC

(57) ABSTRACT

The invention relates to the field of intelligent electronics, and more particularly, to a rapid recognition method and a household intelligent robot. The method, applicable to the household intelligent robot, comprises the steps of: pre-setting a plurality of personal files corresponding to different users; collecting identification information associated with features of the user, and establishing an association between the identification information and the personal file corresponding to the user; the household intelligent robot collecting the features of the user and matching the user features with stored identification information, so as to identify the user; if the user is successfully identified, executing a retrieving step, otherwise, exiting; and the (Continued)

retrieving step comprising retrieving the corresponding personal file according to the identified user, and working according to the personal file.

16 Claims, 1 Drawing Sheet

(51) Int. Cl.
| | |
|---|---|
| *G06F 16/907* | (2019.01) |
| *G06F 16/22* | (2019.01) |
| *G06F 16/9535* | (2019.01) |
| *G10L 17/00* | (2013.01) |

(52) U.S. Cl.
CPC ..... *G06K 9/00255* (2013.01); *G06K 9/00288* (2013.01); *G06K 9/00664* (2013.01); *G06K 9/00892* (2013.01); *G06F 16/22* (2019.01); *G06F 16/9535* (2019.01); *G10L 17/00* (2013.01)

(58) Field of Classification Search
CPC ........... G06K 9/00255; G06K 9/00288; G06K 9/00664; G06K 9/00892
See application file for complete search history.

(56) References Cited

U.S. PATENT DOCUMENTS

| | | | | |
|---|---|---|---|---|
| 9,538,005 | B1* | 1/2017 | Nguyen | H04M 3/4936 |
| 10,127,226 | B2* | 11/2018 | Patris | G06N 3/008 |
| 2006/0047362 | A1* | 3/2006 | Aoyama | G10L 15/22 |
| | | | | 700/245 |
| 2013/0078600 | A1* | 3/2013 | Fischer | G09B 19/00 |
| | | | | 434/236 |
| 2014/0237576 | A1* | 8/2014 | Zhang | G06F 21/32 |
| | | | | 726/7 |
| 2015/0088310 | A1* | 3/2015 | Pinter | G06Q 50/22 |
| | | | | 700/253 |
| 2016/0156771 | A1* | 6/2016 | Lee | G06K 9/00288 |
| | | | | 455/414.1 |
| 2018/0136615 | A1* | 5/2018 | Kim | G05B 13/027 |
| 2018/0143645 | A1* | 5/2018 | Lee | B25J 11/0015 |
| 2018/0144649 | A1* | 5/2018 | el Kaliouby | G06K 9/00302 |
| 2018/0187969 | A1* | 7/2018 | Kim | F25D 29/00 |

FOREIGN PATENT DOCUMENTS

| | | |
|---|---|---|
| CN | 204462847 U | 7/2015 |
| CN | 104951077 A | 9/2015 |
| CN | 106570443 A | 4/2017 |

* cited by examiner

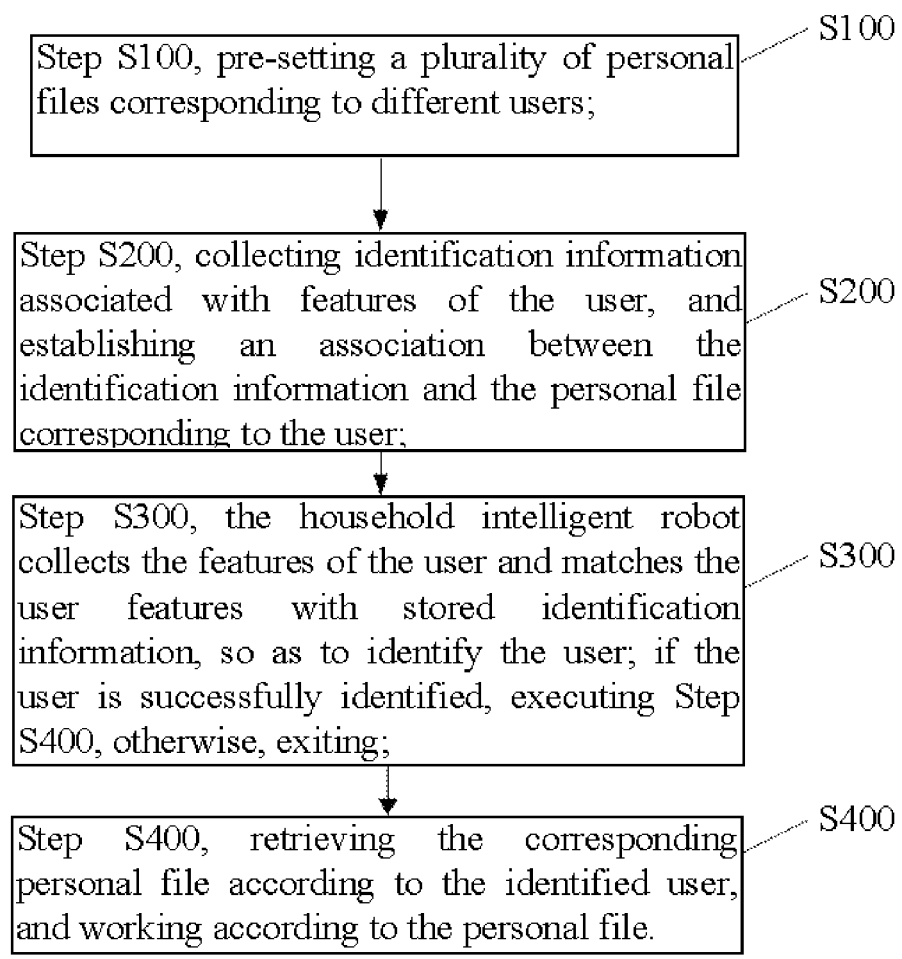

FAST IDENTIFICATION METHOD AND HOUSEHOLD INTELLIGENT ROBOT

This application is a 35 U.S.C. § 371 national phase filing of International Application No. PCT/CN2016/101567, filed Oct. 9, 2016, which claims the benefit of Chinese Patent Application No. 201510650110.7, filed Oct. 9, 2015, the disclosures of which are incorporated herein by reference in their entireties.

BACKGROUND OF THE INVENTION

1. Field of the Invention

The invention relates to the field of robots, and more particularly, to a household intelligent robot and a rapid identification method applicable to the household intelligent robot.

2. Description of the Related Art

With the popularity of intelligent electronics, more and more families have begun to use intelligent electronic products, also known as household intelligent robots.

Nowadays, intelligent electronic devices have been widely used among the public, and the household intelligent robot has been used at ordinary people's home. However, existing household intelligent robots follow the one-to-one operation mode of the traditional mobile terminal. In this operation mode, since all the family members are treated as one user, that is, we can see no difference among the members, each member in the family cannot get a personalized service when using the household intelligent robot, and status of the household intelligent robot is weakened, and thus popularization of the household intelligent robot is affected.

SUMMARY OF THE INVENTION

Aiming at the foregoing problems, the present invention provides a rapid identification method and a household intelligent robot capable of rapidly identifying family members and providing personalized services to each family member.

The technical solution is as follows:

a rapid identification method, applicable to a household intelligent robot, comprising:

Step S100, pre-setting a plurality of personal files corresponding to different users;

Step S200, collecting identification information associated with features of the user, and establishing an association between the identification information and the personal file corresponding to the user;

Step S300, the household intelligent robot collecting the features of the user and matching the user features with stored identification information, so as to identify the user;

if the user is successfully identified, executing Step S400, otherwise, exiting; and Step S400, retrieving the corresponding personal file according to the identified user, and working according to the personal file.

Preferably, the above-mentioned rapid identification method, wherein the user starts up the household intelligent robot by an activated voice, and sends a command to the household intelligent robot.

Preferably, the above-mentioned rapid identification method, wherein the identification information comprises a voiceprint model.

Preferably, the above-mentioned rapid identification method, wherein the identification information comprises a facial image model.

Preferably, the above-mentioned rapid identification method, wherein the voiceprint model collection methods comprise a first active collection and a first automatic collection, wherein the first active collection collects the activated voice of the user in advance according to the household intelligent robot to acquire the voiceprint model of the user; and wherein the first automatic collection automatically acquires the voiceprint model of the user according to the initial activated voice, used by the user and collected by the household intelligent robot.

Preferably, the above-mentioned rapid identification method, wherein the facial image model collection methods comprise a second active collection and a second automatic collection, wherein the second active collection collects a facial image of the user in advance according to the household intelligent robot to acquire the facial image model of the user; and wherein the second automatic collection automatically reads the facial image of the user and acquires the facial image model after acquiring the voiceprint model of the user according to the household intelligent robot.

Preferably, the above-mentioned rapid identification method, wherein the personal file comprises a history record and a favorites list, and the household intelligent robot receives a command of the identified user, and executes the command according to the history record and the favorites list in the personal file of the identified user.

Preferably, the above-mentioned rapid identification method, comprising: providing a storage unit for storing a plurality of pre-recorded voice associated with time, wherein the personal file comprises a name of the user; and the household intelligent robot automatically performs a facial image identification on the user, retrieves the name of the user in the personal file according to a identification result, selects a corresponding pre-recorded voce stored in the storage unit according to the current time, and finally splices the name with the pre-recorded voice by utterance of a machine before playing the name.

Preferably, the above-mentioned rapid identification method, comprising: providing a camera for reading the facial image of the user.

Preferably, the present invention further provides a household intelligent robot, adopting the above-mentioned rapid identification method Beneficial effects of the present invention are as follows: by adoption of the technical solution, different users can be identified rapidly, and identification performance and identification rate can be improved, such that the household intelligent robot becomes more intelligent and can provide personalized services depending on different users' features, thereby having wide application prospects.

BRIEF DESCRIPTION OF THE DRAWINGS

The accompanying drawings, together with the specification, illustrate exemplary embodiments of the present disclosure, and, together with the description, serve to explain the principles of the present invention.

FIG. 1 is a flowchart of an embodiment of a rapid identification method and a household intelligent robot of the present invention.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

A rapid identification method, applicable to a household intelligent robot, as shown in FIG. 1, comprising:

Step S100, pre-setting a plurality of personal files corresponding to different users;

in a preferred embodiment of the present invention, creating a personal file for each of the different users for the purpose of storing relevant information of the different users, for example, music, hobbies and the like which they are interested in, such that the household intelligent robot may provide different personalized services for each family member depending on the relevant information.

Step S200, collecting identification information associated with features of the user, and establishing an association between the identification information and the personal file corresponding to the user;

by establishing the association between the personal file of the user and the identification information, and obtaining the personal file corresponding to the user through the identification information, it is possible to enable the household intelligent robot to work according to different information recorded in each personal file, and thus to provide the personalized service for each family member.

In a preferred embodiment of the invention, the identification information comprises a voiceprint model.

On the basis of the present invention, further, the voiceprint model collection methods comprise a first active collection and a first automatic collection, wherein the first active collection collects the activated voice of the user in advance according to the household intelligent robot to acquire the voiceprint model of the user; and the active collection is about entering some information into the robot and making some settings on the robot for future use, such as a setting of the activated voice, and a collection of the identification information related to each family member when using the household intelligent robot for the first time. The first automatic collection automatically acquires the voiceprint model of the user according to the initial activated voice, used by the user and collected by the household intelligent robot.

The collection of identification information for a new user can be achieved through the automatic collection of the household intelligent robots. For example, when the new user gives a command to the household intelligent robot for the first time (e.g., calls a name setting for the household intelligent robot), the household intelligent robot is activated based on the activated voice, and the voice of the user is collected to produce a voiceprint model. In response to the user's command, the identification information is collected and a new user's personal file is created at the same time. The collected voiceprint model is saved as the identification information.

In a preferred embodiment of the invention, the identification information comprises a facial image model.

On the basis of the present invention, further, the voiceprint model collection methods comprise a second active collection and a second automatic collection, wherein the second active collection collects a facial image of the user in advance according to the household intelligent robot to acquire the facial image model of the user; and the active collection is about entering some information into the robot and making some settings on the robot for future use, such as a setting of the activated voice, and a collection of the identification information related to each family member when using the household intelligent robot for the first time.

The second automatic collection automatically reads the facial image of the user and acquires the facial image model after acquiring the voiceprint model of the user according to the household intelligent robot.

When the automatic collection of the new user's identification information is performed, the collection of the face image model for the new user is also included to facilitate the identification of the user when using the household intelligent robot next time.

Step S300, the household intelligent robot collects the features of the user and matches the user features with stored identification information, so as to identify the user;

if the user is successfully identified, executing Step S400, otherwise, exiting;

In a preferred embodiment of the invention, when the household intelligence robot is identifying the user, for example, if the collected facial image is so blurred that facial recognition cannot be performed, recognition of the user's voiceprint is automatically performed; if the identity of the user is identified through the voiceprint, even if the facial image recognition is not successful, the user can also be identified by the household intelligent robot by use of voice recognition.

In a further preferred embodiment, either the image recognition or the voiceprint recognition is successful, the household intelligent robot successfully identifies the user; only in the case when neither the facial recognition nor the voiceprint recognition is successful, the household intelligent robot fails in identifying the user, then the user can be identified again by voice or facial image recognition.

Step S400, retrieving the corresponding personal file according to the identified user, and working according to the personal file.

In a preferred embodiment of the invention, the user starts up the household intelligent robot by an activated voice, and sends a command to the household intelligent robot.

When the user gives the command to the household intelligent robot, in order to distinguish it from the other languages of the user, the household intelligent robot is generally activated by using a fixed voice, such as giving a nice name to the household intelligent robot, and calling out the name with emotion as you did in calling your family members. With early settings, the household intelligent robot is activated when hearing its own name. Since the activated voice of the robot is fixed, voice recognition based on the activated voice can be done. The user activates the household intelligent robot by sending the activated voice when using the robot. When the robot detects a sound containing its own name, the voiceprint is detected. Hence, the voiceprint detection based on the fixed voice has a higher accuracy.

In a preferred embodiment of the invention, the personal file comprises a history record and a favorites list, and the household intelligent robot receives a command of the identified user, and executes the command according to the history record and the favorites list in the personal file of the identified user.

For example, when one user activates the household intelligent robot and gives a command "Music, please", the robot may identify the user based on the activated voice, record the user's playlist and analyze it. After the user uses the robot for a period of time, the robot can make an accurate recommendation based on the history record and the favorites list of the user. When another family member also gives the same command of "Music, please", the robot may distinguish one from another in the family through the voiceprint, thereby recommending different music for different family members.

In a preferred embodiment of the invention, a storage unit is also provided, for storing a plurality of pre-recorded voice associated with time, wherein the personal file comprises a name of the user; and the household intelligent robot automatically performs a facial image identification on the user, retrieves the name of the user in the personal file according to a identification result, selects a corresponding pre-recorded voce stored in the storage unit according to the current time, and finally splices the name with the pre-recorded voice by utterance of a machine before playing the name.

Saving the pre-recorded voice associated with time in the storage unit, if desired, for a voice broadcast, for example, when the user reaches home at night, the robot detects someone coming around through an infrared camera device. Then the robot will make an active self-activation, identify the identity of the user through the facial image, to obtain the user's personal file, and obtain a corresponding pre-recorded voice in the storage unit according to the current time. At this point, the household intelligent robot may say the name in the personal file through a built-in TTS (Text To Speech), an engine player, and splice the obtained pre-recorded voice, so as to form greetings such as "Good evening, XXX"; or play the user's most favorite music based on the history record in the personal file. As a preferred embodiment, greetings can be saved as a character string in the storage unit, and be directly played out by the TTS engine player, thereby reducing storage space required for the storage unit.

In a preferred embodiment of the invention, a camera is provided to read the user's facial image.

The camera synchronously detects the user's face while detecting the voiceprint. If the user's facial image is not detected, the voiceprint data is saved separately; if the user's facial image is detected, saving the user's face and the voiceprint data simultaneously and associating the same with the personal file. After user's confirmation via the interaction between the robot and the user, associations among the voiceprint, the facial image and the personal file are established.

In a preferred embodiment of the invention, the present invention further comprises a household intelligent robot, adopting the above rapid identification method.

When the user needs to be identified, either the voiceprint model or the face model can be used for identification. Identification carried out in multiple ways is conducive to improving the accuracy and efficiency of the identification. If the user interacts with the robot by activating the robot through the activated voice, the user can be accurately identified through voiceprint recognition; if the user does not use activated voice, the user can also be identified through the face.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A rapid identification method, applicable to a household intelligent robot, comprising:
   pre-setting a plurality of personal files, each of the plurality of personal files corresponding to a user;
   collecting identification information associated with features of the user, and establishing an association between the identification information and the personal file corresponding to the user;
   the household intelligent robot collecting the features of the user and matching the user features with stored identification information, so as to identify the user;
   if the user is successfully identified, executing a retrieving step, otherwise, exiting;
   the retrieving step comprising retrieving the corresponding personal file according to the identified user, and working according to the personal file; and
   providing a storage unit for storing a plurality of pre-recorded voice associated with time, wherein the personal file comprises a name of the user; and, the household intelligent robot automatically performs a facial image identification on the user, retrieves the name of the user in the personal file according to an identification result, selects a corresponding pre-recorded voice stored in the storage unit according to the current time, and finally splices the name with the pre-recorded voice by utterance of a machine before playing the name.

2. The rapid identification method as claimed in claim 1, wherein the user starts up the household intelligent robot by an activated voice, and sends a command to the household intelligent robot.

3. The rapid identification method as claimed in claim 1, wherein the identification information comprises a voiceprint model.

4. The rapid identification method as claimed in claim 3, wherein the voiceprint model collection methods comprise a first active collection and a first automatic collection,
wherein the first active collection collects the activated voice of the user in advance according to the household intelligent robot to acquire the voiceprint model of the user; and
wherein the first automatic collection automatically acquires the voiceprint model of the user according to the initial activated voice, used by the user and collected by the household intelligent robot.

5. The rapid identification method as claimed in claim 1, wherein the identification information comprises a facial image model.

6. The rapid identification method as claimed in claim 5, wherein the facial image model collection methods comprise a second active collection and a second automatic collection,
wherein the second active collection collects a facial image of the user in advance according to the household intelligent robot to acquire the facial image model of the user; and
wherein the second automatic collection automatically reads the facial image of the user and acquires the facial image model after acquiring the voiceprint model of the user according to the household intelligent robot.

7. The rapid identification method as claimed in claim 1, wherein the personal file comprises a history record and a favorites list, and the household intelligent robot receives a command of the identified user, and executes the command according to the history record and the favorites list in the personal file of the identified user.

8. The rapid identification method as claimed in claim 1, comprising: providing a camera for reading the facial image of the user.

9. A household intelligent robot adapted to:
pre-set a plurality of personal files, each of the plurality of personal files corresponding to a user;
collect identification information associated with features of the user, and establish an association between the identification information and the personal file corresponding to the user;
collect the features of the user and match the user features with stored identification information, so as to identify the user;
if the user is successfully identified, execute a retrieving step, otherwise, exit;
the retrieving step comprising retrieving the corresponding personal file according to the identified user, and working according to the personal file; and
the household intelligent robot is further adapted to: provide a storage unit for storing a plurality of pre-recorded voice associated with time, wherein the personal file comprises a name of the user; and, the household intelligent robot automatically performs a facial image identification on the user, retrieves the name of the user in the personal file according to an identification result, selects a corresponding pre-recorded voice stored in the storage unit according to the current time, and finally splices the name with the pre-recorded voice by utterance of a machine before playing the name.

10. The household intelligent robot as claimed in claim 9, wherein the user starts up the household intelligent robot by an activated voice, and sends a command to the household intelligent robot.

11. The household intelligent robot as claimed in claim 9, wherein the identification information comprises a voiceprint model.

12. The household intelligent robot as claimed in claim 11, wherein the voiceprint model collection methods comprise a first active collection and a first automatic collection,
wherein the first active collection collects the activated voice of the user in advance according to the household intelligent robot to acquire the voiceprint model of the user; and
wherein the first automatic collection automatically acquires the voiceprint model of the user according to the initial activated voice, used by the user and collected by the household intelligent robot.

13. The household intelligent robot as claimed in claim 9, wherein the identification information comprises a facial image model.

14. The household intelligent robot as claimed in claim 13, wherein the facial image model collection methods comprise a second active collection and a second automatic collection,
wherein the second active collection collects a facial image of the user in advance according to the household intelligent robot to acquire the facial image model of the user; and
wherein the second automatic collection automatically reads the facial image of the user and acquires the facial image model after acquiring the voiceprint model of the user according to the household intelligent robot.

15. The household intelligent robot as claimed in claim 9, wherein the personal file comprises a history record and a favorites list, and the household intelligent robot receives a command of the identified user, and executes the command according to the history record and the favorites list in the personal file of the identified user.

16. The household intelligent robot as claimed in claim 9, wherein the household intelligent robot comprises a camera for reading the facial image of the user.

* * * * *